United States Patent [19]

Levine

[11] Patent Number: 4,461,552

[45] Date of Patent: Jul. 24, 1984

[54] FILM SOUND TRACK RECORDING AND PLAYBACK SYSTEM

[76] Inventor: Arnold M. Levine, 10828 Fullbright Ave., Chatsworth, Calif. 91311

[21] Appl. No.: 405,198

[22] Filed: Aug. 4, 1982

Related U.S. Application Data

[63] Continuation of Ser. No. 185,509, Sep. 9, 1980, abandoned.

[51] Int. Cl.³ .............................................. G03B 23/08
[52] U.S. Cl. ......................................... 352/27; 352/11
[58] Field of Search ..................... 352/1, 5, 11, 26, 27, 352/37; 346/108; 360/3; 178/22.01; 179/1.5 C

[56] References Cited

U.S. PATENT DOCUMENTS

| | | | |
|---|---|---|---|
| 3,441,949 | 4/1969 | Rolon | 346/108 |
| 3,932,032 | 1/1976 | Weinstein | 352/11 |
| 4,032,224 | 6/1977 | Wray | 352/11 |
| 4,256,389 | 3/1981 | Engebretson | 352/11 |

*Primary Examiner*—Russell E. Adams

*Attorney, Agent, or Firm*—Harvey S. Hertz

[57] ABSTRACT

An electro-optical, motion picture, film sound track recording and playback system in which a complex audio signal wave is successively sampled and digitally encoded according to pulse-code modulation techniques (PCM) extant in the communications art. The digital codes are optically applied to the film sound track and are played back by optical detection as the film runs through a projector. The advantages of PCM signal-to-noise improvement are obtained, and means for the individual sample codes to be "scrambled" on recording and "unscrambled" on replay are shown. The scrambling greatly increases the difficulty of surreptitious copying by "film pirates". One embodiment shown applies and detects the individual code bits through individual optical fibers and the other applies and detects codes serially using a modulated laser source and a controllable refraction optical crystal or a Bragg Cell to scan across the sound track to emplace (and replay) individual sample codes.

5 Claims, 13 Drawing Figures

FILM SOUND TRACK RECORDING AND PLAYBACK SYSTEM

This application is a continuation of application Ser. No. 06/185,509, filed Sept. 9, 1980, now abandoned.

BACKGROUND OF THE INVENTION

1. Field of the invention

The invention relates generally to motion picture sound track recording and play-back, and more particularly to such systems providing improved signal-to-noise ratio and security against film piracy.

2. Description of the Prior Art

In the prior art, it has been standard practice to provide a sound track between the picture frames and the edge of the film. This sound track is light modulated in either a variable density, constant width, or a constant density, variable width format. Play-back is accomplished by continuously converting the instantaneous light intensity from a flood source through a slit or light gate. That intensity, of course, varies with film density or track width as the film passes the light gate. A photocell converts the variable light intensity to electrical form for appropriate filtering and amplification before driving a speaker system providing the last step in sound reproduction.

The prior art systems have been found to be particularly vulnerable to noise due to dust, scratches, wear of film surface and other amplitude influencing factors. When the sound track is subdivided into two tracks for stereo recording and reproduction, the inherent signal-to-noise ratio declines further. The encountered noise manifests itself as clicking, popping and hissing sounds.

A logical outgrowth of the industry's efforts to improve cinema theater sound quality was the use of magnetic tape sound track (or tracks) processed onto the film in the sound track area. Although the quality of sound thereby obtained is very good, the production and processing costs are very high. First the picture must be shot and the sound, synchronously, but separately recorded. The film is subsequently processed to develop the picture, then to affix the magnetic track (tracks) and finally to record the sound. The sound recording is thus very expensive and theaters showing such films require additional equipment not compatible with the traditional optically recorded sound tracks (academy sound). Still further, the magnetically recorded sound tracks are subject to damage due to extraneous magnetic fields encountered (in shipment, for example) and therefore must be specially handled.

In a more economically successful approach, appreciable signal-to-noise improvement has been obtained in the rather widely accepted, so-called Dolby system. Basically the Dolby system envolves pre-emphasis on recording and de-emphasis on reproduction. This pre-emphasis is undertaken in frequency regions in which noise is a particular problem, subsequent de-emphasis operating to reduce the desired frequencies to normal, the proportional reduction of noise frequencies thus tending to suppress noise in the overall. Such systems are generically referred to as companders, however the Dolby system has produced improvement over the basic compander concept.

The need currently exists for quantum step improvement in the motion picture sound recording and play-back art. Improvements are far more dramatic and economically significant when they preserve the compatibility of apparatus to show films recorded in the very widely used "Academy" format.

The manner in which the invention provides for very significant signal-to-noise improvement with low cost apparatus and with the highly desired film compatibility will be evident as this description proceeds.

SUMMARY OF INVENTION

The invention addresses the prior art inadequacies by incorporating pulse code modulation concepts into an optical recording system for motion picture sound track.

A complex electrical (audio) wave is successively sampled at a rate of 2 or more times the highest frequency to be reproduced and individually digitally encodes these amplitudes in a corresponding digital word capable of representing aplitude on an instantaneous basis. The code words are emplaced on the film sound track as very small light dots in the code word configuration across the sound track and are detected and reconverted as points on a reconstituted sound electrical wave. Amplitude is hard limited so that the information is contained substantially only in the code digital value with dramatic improvement in signal-to-noise ratio resulting.

The inherent signal-to-noise advantage in pulse-code-modulation is known in the communications art basically and has been described in the technical literature. For example, the text "Modulation, Noise, and Spectral Analysis, Applied to Information Transmission" by Philip F. Panter, Ph.D. (a McGraw-Hill Publication) describes this advantage in general context. On page 669 of that text, the advantage appears graphically in FIG. 21-4.

The combination of the invention can be instrumented in serial or parallel digital forms both embodiments being shown and described hereinafter.

In the parallel implementation, the encoded values are conveyed as light pulses through optical fibers, each of which transmits a light pulse as appropriate to record a parallel code word across the sound track. A reverse process is described, for play-back.

In the serial implementation, a laser source is intensity modulated and focused into a sharp beam which is scanned across the sound track for each code word, the intensity modulation placing the code dots. For re-play, a flood laser focused into a sharp beam is synchronously scanned across the recorded film codes and a congruent aperature light-to-electric transducer reproduces the code in electrical form. Digital-to-analog conversion restores the original sound wave on a point-by-point basis.

Either embodiment can be applied to stereo recording and reproduction by duplication of apparatus or in the case of the serial embodiment, by extending the scan over two parallel sound tracks and applying duplexing throughout the sampling and encoding process.

The details of the disclosed embodiments are fully described hereinafter. The very advanced components employed are per se known in the art and will be recognized by those of skill in this art. For example, the controllable refraction crystal or Bragg device both provide high bandwidth scanning and both have been well documented in the technical literature. Optical fibers and the related transducers are likewise known in their corresponding arts.

BRIEF DESCRIPTION OF THE DRAWINGS

FIG. 1 (a) is a section of film showing the arrangement and location of the encoded sound track;

FIG. 1 (b) is a detail of the sound track;

DETAILED DESCRIPTION

As aforementioned the present invention employs the principals of pulse-code modulation (PCM) as that term is used in the communications art. The advantages of pulse-code modulation in terms of signal-to-noise improvement as well as economical instrumention are particularly useful in motion picture film sound track electro-optical recording and play-back. Compared to magnetic tape recording and play-back, the inherent noise problems associated with optical sound systems are more severe and so as this description proceeds, the superiority of the system of the invention will be appreciated.

Figure 1:
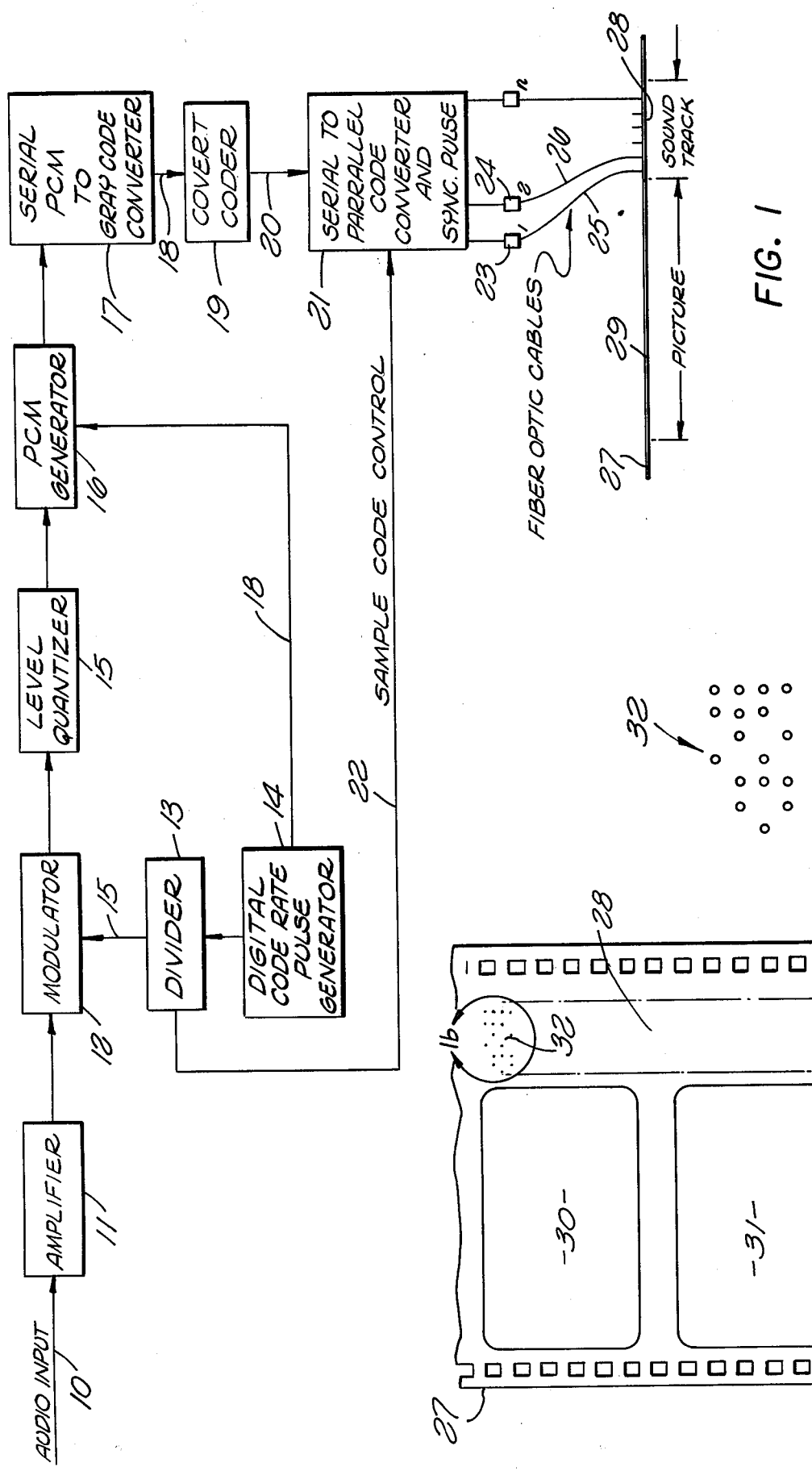
FIG. 1 is a structural and functional schematic block diagram of a digital sound track recorder according to the invention.

Referring now to FIG. 1, the audio input 10 will be understood to receive sound developed and related to the picture in the normal manner. Amplification, as necessary, is provided in amplifier 11. Modulator 12 receives the output of amplifier 11, and is also driven by a digital code rate generator (clock) 14 through a divider (count-down) 13 to produce the continuous sampling of the complex audio waveform at 10.

Figure 3:
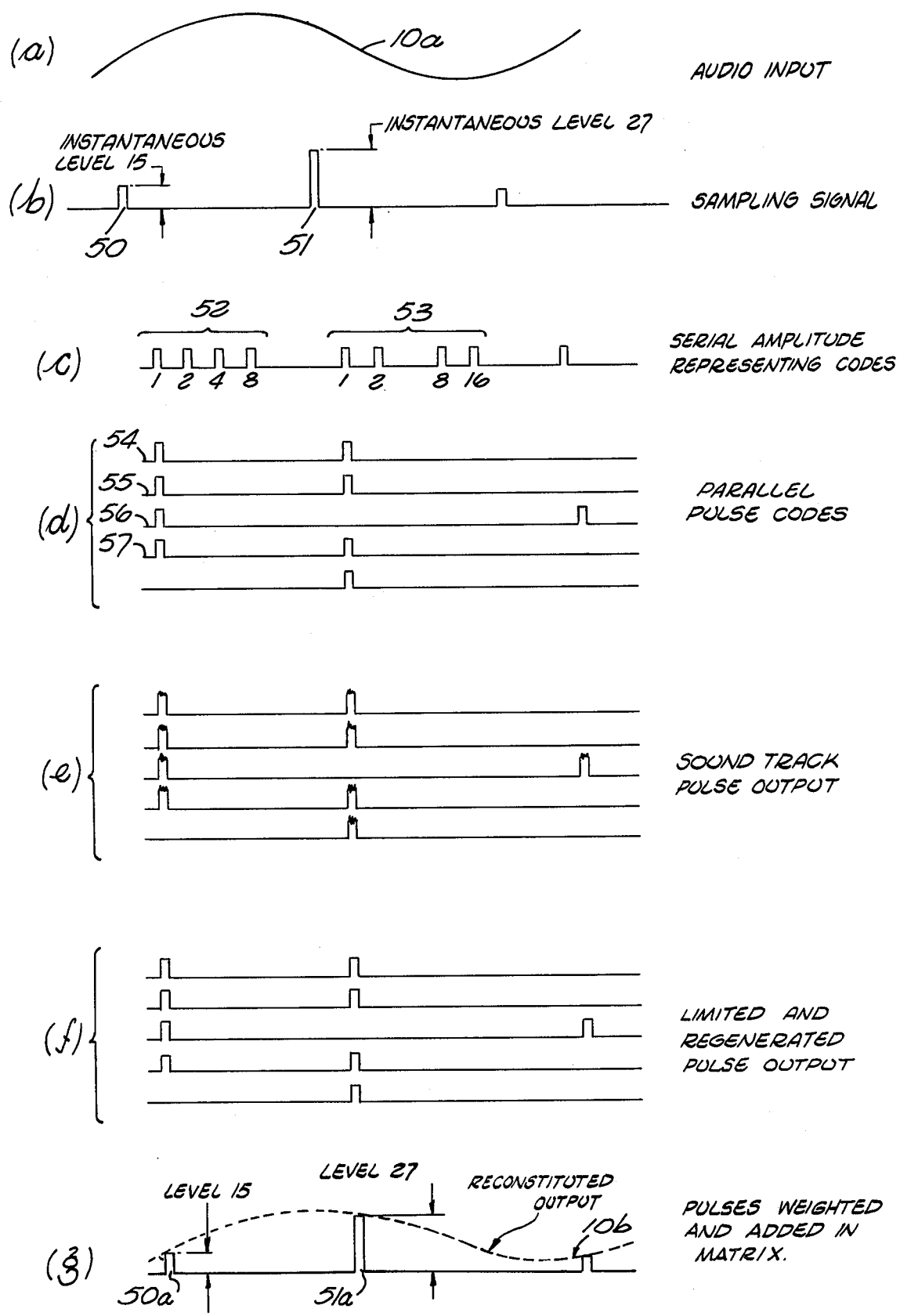
FIG. 3 (a) through (g) depict a series of waveforms at various points in FIGS. 1 and 2.

At this point in the description it is advantageous to also consider the waveforms of FIG. 3, which depicts the audio input at 10 in FIG. 3 (a) as 10a. Although 10a is depicted as a more-or-less sinusoidal wave for simplicity, it would normally be a complex wave containing all the frequencies and overtones associated with typical motion picture sound. In FIG. 3(b) several quantized sample pulses are illustrated, including the typical samples 50 and 51. It will be understood, however, that these sample pulses occur repetitively in close time proximity at a minimum frequency of repetition of 2 times the highest frequency component to be reproduced. That factor of 2 is is one which has been developed in the communications art and is well known in connection with pulse code modulation generally.

On FIG. 3(b) the pulses 50 and 51 have amplitudes which correspond to instantaneous amplitudes of waveform 10a at the sample instants of time. The amplitude levels of samples 50 and 51 are arbitrarily assumed to be 15 and 27, respectively. The total number of sample amplitude levels selected determines the length of the code in bits, since these levels are each subsequently represented by a discrete code value or encoded number. For example, it is known that a seven bit code can have 127 discrete values and therefore can represent the same number of discrete sample amplitudes. More or fewer code bits could be employed, of course, the code length being a design choice based on the desired fidelity.

In FIG. 3(c), two codes are represented, namely 52 and 53, corresponding to sample pulses 50 and 51, respectively. It should be understood that the time scale for FIGS. 3(c) and 3(d) is entirely different from that of FIGS. 3(a) and 3(b). The amplitude codes of FIG. 3(c) must each be generated within the times of samples 50 and 51, respectively. In modern digital technology this is readily accomplished, since the sample pulses are each on the order of 40 microseconds in duration, assuming a sampling rate of 20 KHz (corresponding to a 10 KHz audio bandwidth). Thus the full duration of a code of seven or eight bits, or even more, can readily be confined to the time of a sampling pulse even without the use of the most advanced (highest speed) digital coding techniques.

In accordance with the foregoing, it will be realized that rate pulse generator (clock) 14 will have a frequency consistent with code bit duration and is counted-down substantially in divider 13 to produce the comparatively much lower sampling rate. Thus pulses at 15 are delivered to the modulator (sampler) 12 to provide samples in close succession producing corresponding samples at the output of 12. These samples are continuously representative of the instantaneous amplitude of the wave 10a (FIG. 3), the pulses 50 and 51 of FIG. 3(b) being representative of two arbitrarily selected and widely separated points on 10a.

The level quantizer of 15 is the same type of circuit used to drive a sample coder in communications PCM systems. Basically, its output is a waveform in which the successive samples are represented by signal levels (steps) extant during each sample duration. The code rate generator 14 preferably contains circuits for providing code pulse bit timing after a short settle-down time from the leading edge of each sample out of modulator 12. The PCM generator 16 is basically a pulsed analog-to-digital converter, the output of which is represented at FIG. 3(c) The conventional circuit of the type required at 16 may be of the type which generates a code serially in "count-up and stop" fashion for each quantized sample level. Such codes usually work on an implicit principle, that is they count-up freely until a connected D/A converter produces an output matching the input value to be coded.

From the output of 16, a serial to parallel converter 21 receives the codes and converts them to parallel form for recording on the film. The blocks 17 and 19 between 16 and 21 not necessary to the basic concept of the invention, however their use is highly advantageous in this art. Block 17 may be only a flip-flop inverter or an arrangement of flip-flops which reduces the vulnerability of the code to extraneous pulses and, in fact, insures that the serial code at 18 will not vary from its intended value by more than one least significant bit. This technique is entirely conventional and well-known in the digital coding art.

One of the more serious problems faced by film makers is that of surreptitious copying by "film-pirates." Block 19 provides covert coding (scrambling) by converting the code at 18 on FIG. 1 to a different code according to a predetermined pattern. Such a conversion can be accomplished in block 19 by conventional circuits providing automatic selection of a new code word for each successive word at 18. The resulting covert codes do not represent time sampled values in a play-back without unscrambling, and therefore a useful sound track cannot be stolen without the corresponding complementary code reconversion. This process will be more fully described hereinafter.

Once the codes at the output of PCM generator 16 (or at 18 or 20 if blocks 17 and 19 are employed) are converted to parallel form in the converter 21, they are ready for optical recording of the film 27 (seen on edge in FIG. 1). Film 21 will be understood to be moving into or out of the plane of the figure. For this, each output lead of 21 corresponds to a bit of the parallel code, and each such lead connects to a discrete electric-to-optical transducer. These transducers can be LED devices, for example, represented typically at 23 and 24. Each of these transducers drives an optical fiber such as 25 and 26 driven from transducers 23 and 24, respectively. Ultimately the optical fibers comprising one for each code bit are gathered in close proximity in a linear array extending across a portion of the sound track 28 normal to the direction of film traverse. The sound track 28 is located conventionally adjacent to the picture frames 29.

In FIG. 1(a) a flat view of a segment of film shows typical relative sound track location vis-a-vis two representative picture frames 30 and 31. In functional terms however, no rigid relationships are to be infered from FIG. 1(a). In fact, although a monaural arrangement is depicted and described, stereo with two adjacent narrower sound tracks is readily achievalbe with appropriate duplication of recording and play-back instrumentation. The optical fibers 25, 26, etc., are conventional and are preferably very small (thread like). Accordingly, the linear array of optical fiber ends adjacent to the film surface fits well within the available sound track width, even if there are in fact two parallel tracks for stereo sound.

The serial-to-parallel code conversion on block 21 is effected synchronously via a sample control pulse on lead 22. The pulse repetition frequency on lead 22 is equal to that on lead 15, the clock pulse from 14 being supplied if required by the type of circuit employed at 21.

At 32 on FIG. 1(b) an exaggerated view of a few parallel codes is illustrated, these being arbitrarily depicted and do not correspond to any particular points of the waveform of FIG. 3(a). It is to be noted, however that one pulse at either end of each code is a synchronizing pulse (shown on the right as depicted in FIG. 1(b)). Use of such a synchronizing pulse in a coding and decoding system is conventional in the digital arts and well understood by the skilled practitioner. Use of a discrete synchronizing pulse with each code word makes the decoding process substantially independent of film speed variations.

FIG. 3(d) illustrates the bit pulses at four code leads of the parallel code at 54, 55, 56 and 57. Leads 54 and 55 may be correspond, for example, to optical fibers 25 and 26. As would be expected, the serial code 52 is now represented by a pulse in each of four parallel leads and the absence of a pulse in waveform 56 corresponds to the absence of a third pulse in code 53.

No light gate, as usually employed in sound track recording, is necessary, since the light outputs from the optical fibers are contained dots of light, although appropriate shielding may be employed to avoid smearing on sensitive film, if necessary.

The light levels provided by the transducers 23, 24, etc., need not be great, since even the least sensitive film can be effectively encoded with the successive parallel sample codes depicted at 32.

Figure 2:
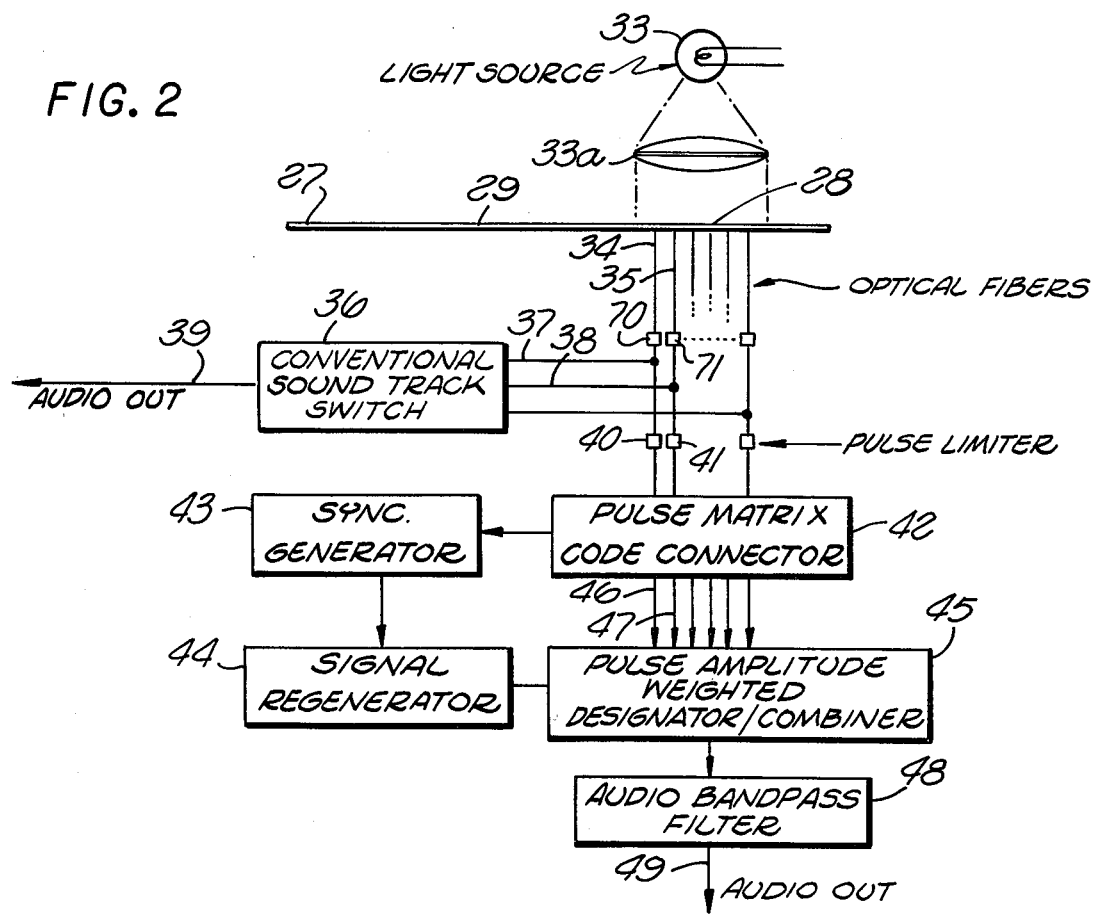
FIG. 2 is a schematic block diagram of a compatible playback system according to the system of the invention for reproducing from either digital or prior art analog sound tracks.

Referring now to FIG. 2, a schematic block diagram of a preferred form of compatible play-back device is presented. One of the additonal advantages of the present invention is provision of play-back apparatus which is entirely compatable with conventional sound tracks of either the variable width or variable density type.

In FIG. 2, the film 27 is illustrated edge-on in a comparable view as compared to FIG. 1. A light source 33 with lense system 33a produces illumination of the sound track over its full width but over only a limited orthogonal dimension (in direction of film travel). A play-back array of optical fibers including 34, 35, etc., includes the same number of optical fibers as employed in FIG. 1, also arranged in a close-spaced array with their ends adjacent to the film surface. Again, no light gate need be employed as in prior art analog play-back systems, since the small, and discrete optical fiber apertures adjacent to the film surface provide the same function.

The apparatus of FIG. 2 is preferably installed as a part of the motion picture projector, and at least those portions of the combination of the invention in direct proximity with the film must be a part of the projector mechanism. The optical fibers, 34, 45, etc., may alternatively be long enough to convey their bits of the code to a bank of optical-to-electric transducers (one for each optical fiber) 70, 71, etc., located away from the projector.

It will be seen that the outputs of the optical-to-electric signal transducers 70, 71, etc., which may be photocells, photodiodes, etc., provide a play-back of the parallel code in electrical signal form as it was recorded in the apparatus of FIG. 1. On FIG. 3(e) such recovered code pulses are depicted. It will be noted that they are in a timing pattern identical with that of FIG. 3(d), but are not amplitude limited. Immediately following the transducers 70, 71, etc., pulse limiters on a one-for-one basis (40, 41, etc.) amplitude clip the FIG. 3(e) pulses, producing a parallel code pattern 3(f) without the superimposed noise of dust, film scratch and other causes, and substantially identical to the recording code of FIG. 3(d).

From the limiter 40, 41, etc., outputs, the Pulse Matrix Connector 42 receives the parallel code and unscrambles it by performing the reverse of the process applied in the covert coder 19 of FIG. 1. The circuitry of block 42 is conventional in the digital arts and those of skill in the art can readily implement it and the covert code 19 previously referred to.

A synchronizing pulse is derived from each code word in 42, this being tantamount to recovery of a clock pulse in standard digital terminology. Blocks 43 and 44 effect this function to provide clock pulse signals to Pulse Amplitude-Weighted Designator/Combiner 45, the latter reestablishing points on a reconstructed audio waveform 10(b) of FIG. 3(g). The block 45 includes conventional circuits for converting each pulse code in turn to an analog value which becomes a point on 10(b). The point value generation is basically a digital-to-analog conversion operation, the corresponding codes producing analog values such as 50a and 51a (inverse samples) providing points on 10(b) of FIG. 3(g) Selective weighting of each of the pulses of the codes in accordance with its mathematical significance in the process of digital to analog conversion provides amplitude reconstruction in block 45. Weighting provides amplitude compression or expansion in block 45 as desired, this too being conventionally accomplished.

Weighting may, of course, not be desired at all in some applications, in which case the block 45 simply generates and combines the series of reconstructed analog points on 10(b).

Finally, in Audio Bandpass Filter 49, undesired frequencies including higher frequency components can be eliminated from output 49. The typical bandpass of filter 48 would be on the order of 10 KHz for a relatively high fidelity theater system.

The comments made in respect to stereo recording in connection with FIG. 1 apply also to FIG. 2, that is, a double sound track stereo system can be accommodated with appropriate duplication of equipment and may be interleaved as will be understood by the skilled artisan.

For compatible operation, i.e. use of the apparatus of FIG. 2 for reproduction of prior art variable width or variable density sound track, the apparatus of FIG. 2 includes block 36 called Sound Track Switch. This block accepts the outputs of the bank of optical-to-light transducers (70, 71, etc.) which, under these circumstances is not the parallel code previously described at this point, but merely variable applitude electrical signal from a greater or lesser number of illuminated optical fibers in the play-back array as a function of instantaneous sound track width, or a fully illuminated optical fiber array at variable intensity (for the variable density case). In either case, the block 36 parallels the multiple electrical signals (37, 38, etc.) into a single audio signal output by combining all transducer (70, 71, etc.) outputs essentially linearly.

It will be seen from the foregoing that the system of the invention is compatible with sound track recorded according to the invention or according to the prior art (Academy) sound track system.

Figure 4A:
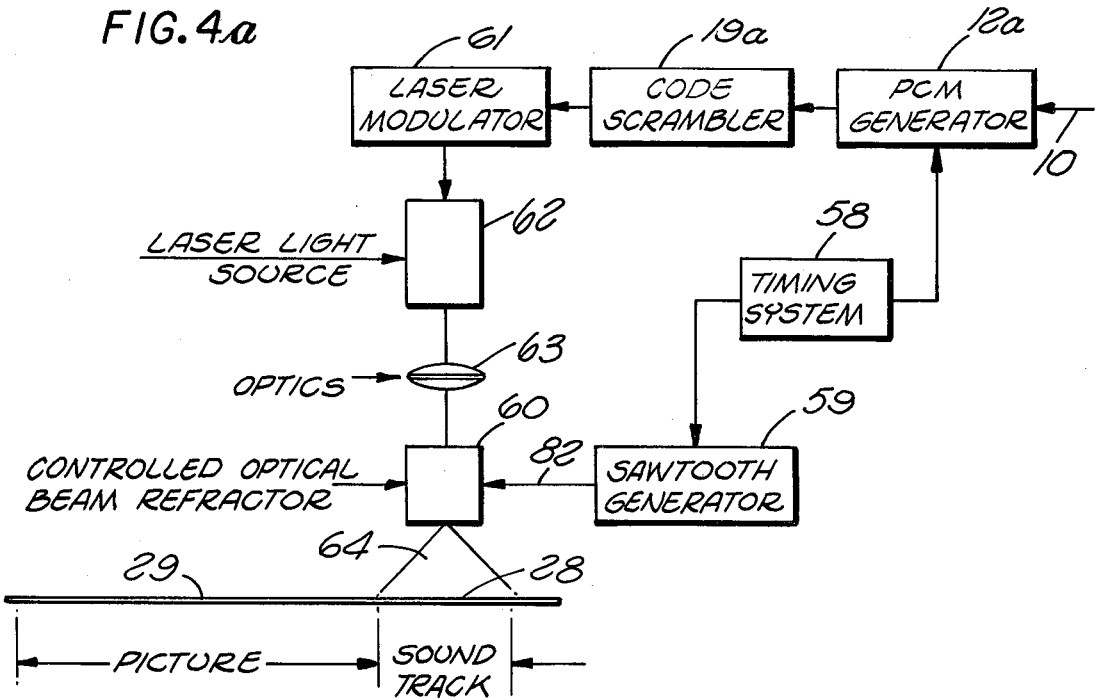
FIG. 4a and 4b are alternative recording and playback arrangement respectively, employing the basic concepts of the invention.

Referring now to FIG. 4(a), a second embodiment of digital PCM film recorder is shown. Here the same sound input 10 is identified as in FIG. 1. The PCM unit 12a performs the same function as blocks 15 and 16, the output of 12a being a serial code for each sample. Timing unit 58 will be understood to provide the basic clock frequency (code bit rate) and also the divided-down sampling frequency as more fully described in connection with FIG. 1. Code scrambler 19a may be identical with 19 of FIG. 1, in that it provides a substitute code value for each code it receives. The substitute codes are predetermined, but superficially random so that, in the absence of reconstitution from an "unscrambler" which supplies each original code word when presented with each corresponding "scrambled" word, no meaningful sound signal output can be derived from it.

The programmed read-only-memory (PROM) unit previously identified can provide the code of the "scrambler" 19a, as it would for 19 of FIG. 1. Such units can be instrumented in the form of magnetic cards, a well known digital art technique, and thereby be changed for each film production, or for that matter even randomly during the run of a particular film. It will be realized that "unscrambling" magnetic cards must be available to match each "scrambling" program, however this can be accomplished with relative ease.

From the output of 19a (or from 12a if scrambling is not to be employed) a laser modulator 61 of conventional type pulses laser source 62 according to the code to be recorded. Lens 63 appropriately focuses the resulting modulated light beam into the optical beam controlled refractor 60. A sawtooth control signal controls the angle of refraction produced by 60 to produce a rapid scan of the sharply focused modulated laser beam in a repetitive pattern of sweeps 60 over the sound track width dimension 28. The sawtooth sweep signal will have the same frequency as the sampling rate, and during each sweep cycle a code word is "laid down" serially across the sound track width. The nature of these code words is essentially the same as shown at 32 (FIG. 1), except that they are serially applied rather than from a parallel code as in FIG. 1. Accordingly serial-to-parallel code conversion is not required for recording in the apparatus of FIG. 4(a). It will be realized however that the film will be moving continuously during recording, therfore each serial sample code must be recorded at a rate so rapid compared to the film advance that the film movement is negligible during each sweep cycle of 60. A sweep of sufficient speed to fulfill this requirement is readily achieved using a controlled refraction crystal or a Bragg cell at 60. Both of these are high bandwidth devices suitable responsive to a fast sawtooth signal on 82. The waveform of this sawtooth will include some quiescent time between successive sweeps to permit the film to move a sufficient amount for spacing of each succeeding code.

Of course, it is not basically necessary that all skew be eliminated from the track codes, as long as the play-back instrumentation is consistent in this regard. If some skew is permitted, i.e. if the film movement is great enough during each code to cause the code bits to be aligned at a slight angle with respect to the sound track width, then the play-back parameters must be consistent. It will be seen subsequently however, that for compatible play-back of digitized sound according to the invention and also prior art "Academy" sound tracks, it is preferable that no appreciable skew be permitted, or the skew be compensated for by tilting the head.

The high intensity of laser source 62 is advantageous since the individual light bursts of the code bits recorded are each present for only a very short time.

Figure 4B:
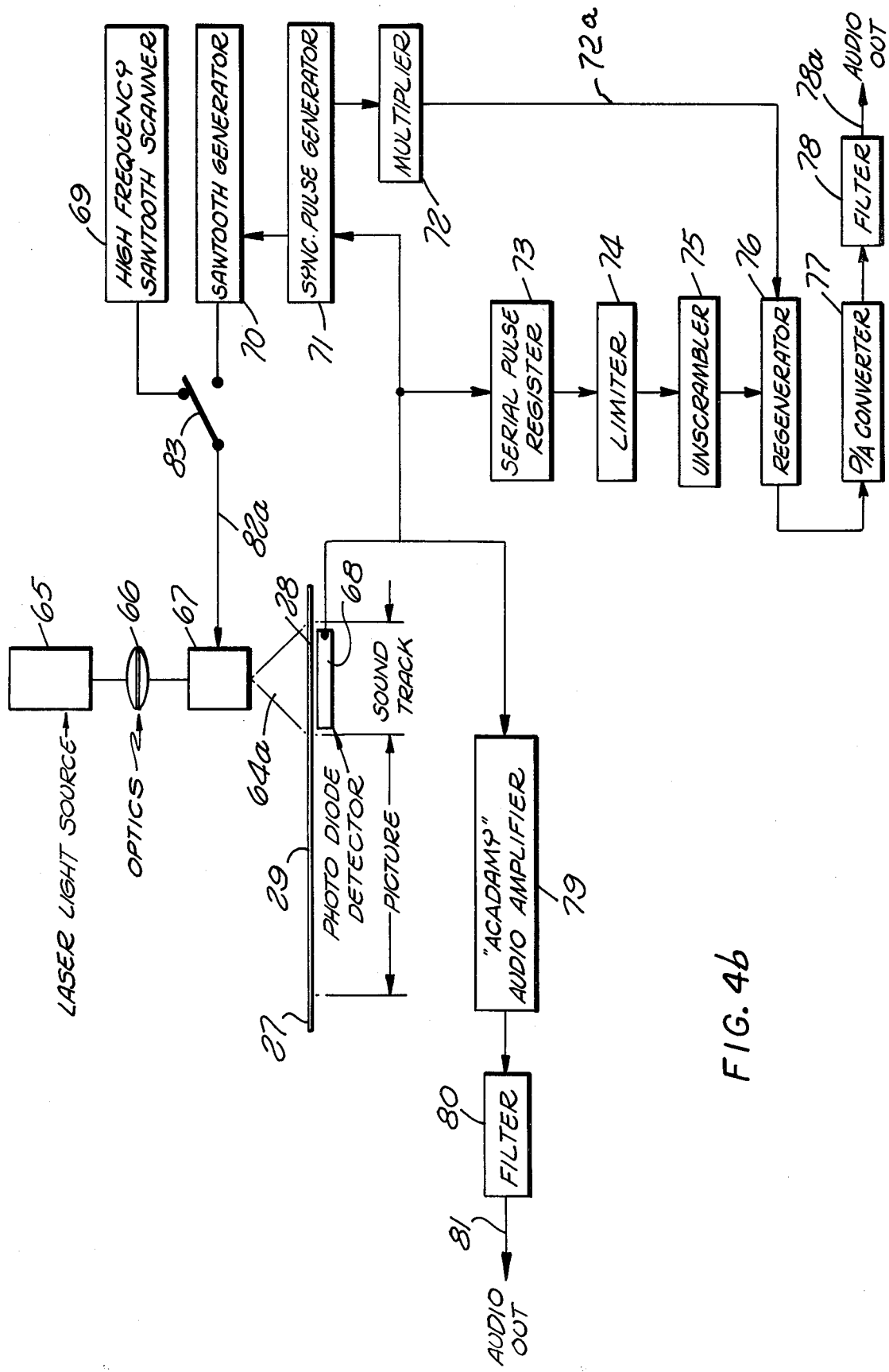

Referring now to FIG. 4(b), a compatible play-back companion instrumentation for use with coded sound track recorded in accordance with FIG. 4(a) is depicted. A laser beam scan 64a similar to that of 64 in FIG. 1 is employed, using a controlled optical beam refractor 67 scanning (sweeping) beam 64a over the sound track maximum width. Refractor 67 will be the same type of device specified for 60 hereinbefore. Laser source 65 is unmodulated in FIG. 4(b), but lens 66 performs the same focusing operation as provided by 63 so that a very sharp but intense beam is provided and is scanned over sound track 28. In FIG. 4(b), the laser beam scan is essentially a flooding operation. Thus, it readily provides an output from the photo diode 68 which has a light accepting aperture congruent with the width of sound track 28.

A switch 83 selects between two sawtooth generators, one being 70 which developes a sawtooth of the duration and duty cycle employed in 59 of FIG. 4(a). The other sawtooth generator 69 provides a higher frequency high duty cycle (100% preferably) sawtooth signal adapted to scan 67 in the manner appropriate for the device selected for 67 from among the options available as discussed in connection with FIG.4(a). Thus, for "Academy" (prior art) sound tracks, the scanning laser acts as a light floodthrough a light gate against the film sound track 28 or between the film and the photodiode 68. An audio pick-up amplifier 79 responds to the light variations due to sound track width modulation or to a variable density sound track for that matter. A standard prior art filter 80 affords some suppression of undesired frequencies as in the usual prior art systems The output 81 thus provides sound reproduction for standard sound tracks.

For play-back of the digitally encoded sound recorded in accordance with FIG. 4(a), switch 83 is thrown to connect sawtooth generator 70 to 67 via lead 82a. Switch 83 is illustrated as it would be for play-back of conventional sound track as hereabove described, but when connected to 70 the sawtooth format consistent with that of 59 in FIG. 1 is applied to 67 and accordingly, the sharply focused laser beam scan 64a is essentially the same as described in connection with 64 of FIG. 1 although here again the laser beam is unmodulated at 64a.

A sync pulse generator responds to the output of photodiode 68 to identify a sync pulse thereon signalling the start of each new code word (sample code) as was described in connection with FIG. 2 for that instrumentation. The sawtooth signals of 70 are thus generated at the time when a code word on the sound track is positioned to be serially read by the 64a scan and detected by photodiode 68. These words are recognized in a register 73, limited in amplitude by 74 to confine the information received to the code digital value to the exclusion of amplitude variations, and then unscrambled in 75. This unscrambler, as previously indicated is the inverse of 19a of FIG. 4(a).

The output sync pulses of 71 are multiplied in 72 to obtain a clock signal at the code bit rate for use in regenerator 76. This regenerator 76 which removes edge modulation is a digital-to-analog converter which may be of the implicit type counting up at the clock rate until a code comparator signals equality with the code extant at the output of 74 at that instant Contemporaneously, a D/A convertor 77 responsive to 76 provides a point on the reconstituted recorded audio wave as at 106 in FIG. 3(g), and filter 78 equivalent to 48 of FIG. 2 removes undesired frequencies to provide an output at 78a which is the equivalent of output 49 of FIG. 2.

As in conventional motion picture projectors, the film will be moved through the projection optics stepwise to provide visual dwell on each frame. The film is looped however to provide slack so that its average traverse speed is presented (steady film advance) at the sound track pick-off point a number of frames ahead of the picture. Those considerations are conventional and well-known in this art and are built into known motion picture projectors.

Referring again to the covert coding and decoding, it will be realized that the "scrambling" function would best be changed from one film to another. At the projector, the block 42 of FIG. 2 may contain a PROM from which the correct code is extracted in response to a code key instruction in the form of a magnetic card or the like. A film pirate would find it necessary to obtain the right PROM control card or other device for the film to be pirated and must have the circuitry of the play-back device according to the invention. Accordingly, it would be much more difficult to successfully make unauthorized copies of the films.

Mechanical supports, details of conventional circuitry, known film projector hardware, and other well-known components of a complete instrumentation of the invention have been omitted for simplicity.

Modifications and further variations within the spirit of the invention disclosed will suggest themselves to those of skill in these arts. Accordingly, the drawings and this description are to be regarded as typical and illustrative only.

I claim:

1. A motion picture film sound track recording and playback system compatible with existing camera and projector film advance mechanisms, comprising:

first means responsive to a complex electric wave representative of sound to be recorded on said sound track for successively sampling the amplitude of said wave and for digitally encoding said samples successively, a continuous amplitude sample representing succession of parallel code words being thereby generated;

second means for recording said code words successively on said sound track as a pattern of light dots recorded on said film, said second means being located along the length of said film where the motion of said film is substantially continuous and linear with time as said film is advanced, said second means including a plurality of electric-to-light transducers, each of said transducers responding to a corresponding digit of said code generated by said first means, and further including a plurality of fiber optic light conductors, each of said conductors being arranged to receive light pulses at a first end, from a corresponding one of said transducers, the second end of said optical fibers being directed generally perpendicular to the surfaces of said film within said sound track in a close-spaced, linear array extending generally transverse to the direction of advance of said film;

third means for continuously converting said light dot patterns to digital codes in electrical form as said film is advanced for projection;

fourth means including a digital-to-analog converter for reproducing said samples from a corresponding code words series from said third means, and for combining said reproduced samples for reconstituting said complex wave;

fifth means responsive to said first means for rearranging the order of at least some of the bits of at least some of said code words according to a predetermined pattern for application to said second means;

and sixth means responsive to said third means for again rearranging the order of said codes therefrom to reconstituted code words substantially the same as said code extant at the output of said first means, said sixth means applying a pattern which is the inverse of said fifth means predetermined pattern.

2. Apparatus according to claim 1 in which said second means comprises a laser diode coupled to each of said optical fibers for recording said light dot patterns as successive parallel digital words as said film is traversed.

3. Apparatus according to claim 1 in which said light-to-electric transducers are solid state photodiodes.

4. Apparatus according to claim 1 in which said sampling is accomplished at a frequency at least 2 times the highest frequency of said complex wave which is expected to be recorded.

5. The system according to claim 1 includes synchronizing means for providing a synchronizing pulse corresponding to each of said digital code words in said first, second, third, fourth and fifth means.

* * * * *